(12) United States Patent
Hsu

(10) Patent No.: US 7,520,521 B2
(45) Date of Patent: Apr. 21, 2009

(54) FRONT FORK HAVING AN AIR PUMP

(76) Inventor: Jung-Yu Hsu, No. 72, Gong Ming South 1st Rd., An Nan Dist., Tainan City (TW)

(*) Notice: Subject to any disclaimer, the term of this patent is extended or adjusted under 35 U.S.C. 154(b) by 322 days.

(21) Appl. No.: 11/626,601

(22) Filed: Jan. 24, 2007

(65) Prior Publication Data
US 2008/0174085 A1    Jul. 24, 2008

(51) Int. Cl.
*B62K 21/02* (2006.01)
(52) U.S. Cl. .................. 280/276; 280/201; 280/275
(58) Field of Classification Search .............. 280/201, 280/275, 276
See application file for complete search history.

(56) References Cited

U.S. PATENT DOCUMENTS

| | | | | |
|---|---|---|---|---|
| 6,592,136 B2 * | 7/2003 | Becker et al. | ............... | 280/276 |
| 6,688,626 B2 * | 2/2004 | Felsl et al. | ................. | 280/275 |
| 7,137,638 B2 * | 11/2006 | Turner | ........................ | 280/276 |
| 7,163,222 B2 * | 1/2007 | Becker et al. | ............... | 280/276 |
| 7,401,800 B2 * | 7/2008 | Jordan | ........................ | 280/276 |

* cited by examiner

*Primary Examiner*—Paul N Dickson
*Assistant Examiner*—Michael R Stabley
(74) *Attorney, Agent, or Firm*—WPAT, P.C.; Anthony King

(57) ABSTRACT

A front fork has an air pump provided in one of a pair of front pipes at respective sides of the front fork. The air pump has an axle inserted into the front pipe. One end of the axle is provided with a piston, and the other end of the axle is connected to a handle. An air chamber is formed in the front pipe.

5 Claims, 5 Drawing Sheets

FRONT FORK HAVING AN AIR PUMP

BACKGROUND OF THE INVENTION

1. Field of the Invention

The present invention relates to a bicycle front fork equipped with an air pump, in particular to one front fork provided with an air pump so that it may replenish air into the front fork to increase the anti-shock ability at any place, any time.

2. Description of the Prior Art

Bicycles are widely used as one of a convenient transportation tool and as an exercise equipment. Each bicycle has an anti-shock system at the front strut to absorb vibration caused by uneven road condition for rider to have a comfortable ride.

A conventional bicycle model uses an inner pipe sleeved into an outer tube along with an anti-shock device, such as pneumatic type, hydraulic type or other mechanical type designed to absorb vibration to provide a comfortable riding experience to the user. The pneumatic type anti-shock has the best result as vibration absorbing. However, the air volume in the front pipes is an important factor. If the fork has too much air, the riding will be hard, wise versa, if the fork has little air, the shock absorbing will not be efficient. Therefore, air in the front pipes must be released when it is too much and be refilled when it is little.

However, the conventional bicycle does not be equipped with an air pump, if the user wants to refill air, they have to borrow the air pump from a bicycle shop which may not be easy to find.

SUMMARY OF THE INVENTION

It is the primary object of the present invention to provide a front fork having an air pump, which can release extra air or refill air at any time, any place.

It is another object of the present invention to provide a front fork having an air pump, which is designed to carry along with the front fork of the bicycle.

According to the present invention, there is provided a front fork having an air pump, said air pump being disposed in one of a pair of front pipes at respective sides of said front fork, a plug being provided in the front pipe, a piston tube being inserted on an outer edge of said plug, said piston tube having a hollow inner, one end of said piton tube being fixedly connected with a fixed plug, a washer is provided in said fixed plug, said fixed plug being secured to one end of said front pipe, the air pump comprising an axle and a handle, said axle being inserted into the inner of said piston tube, one end of said axle being provided with a piston, a gap being formed between said piston and an inner wall of said piston tube, said piston comprising an enlarged section, a small section, and a slanting section between said enlarged section and said small section, a movable ring being provided on said enlarged section; said handle connected to said fixed plug being formed with a threaded hole.

DETAILED DESCRIPTION OF THE PREFERRED EMBODIMENT

Figure 1:
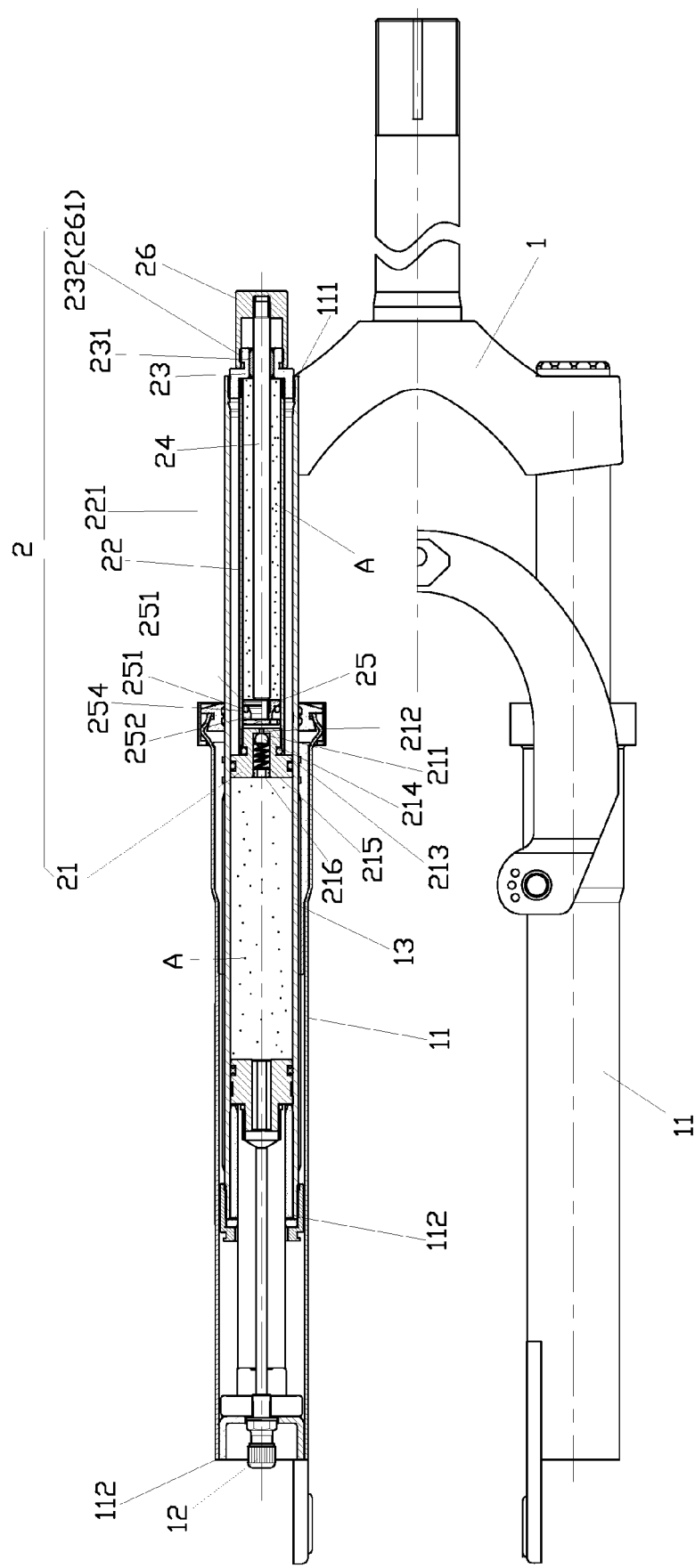
FIG. 1 is a cross-sectioned view of a preferred embodiment of the present invention.
Figure 2:
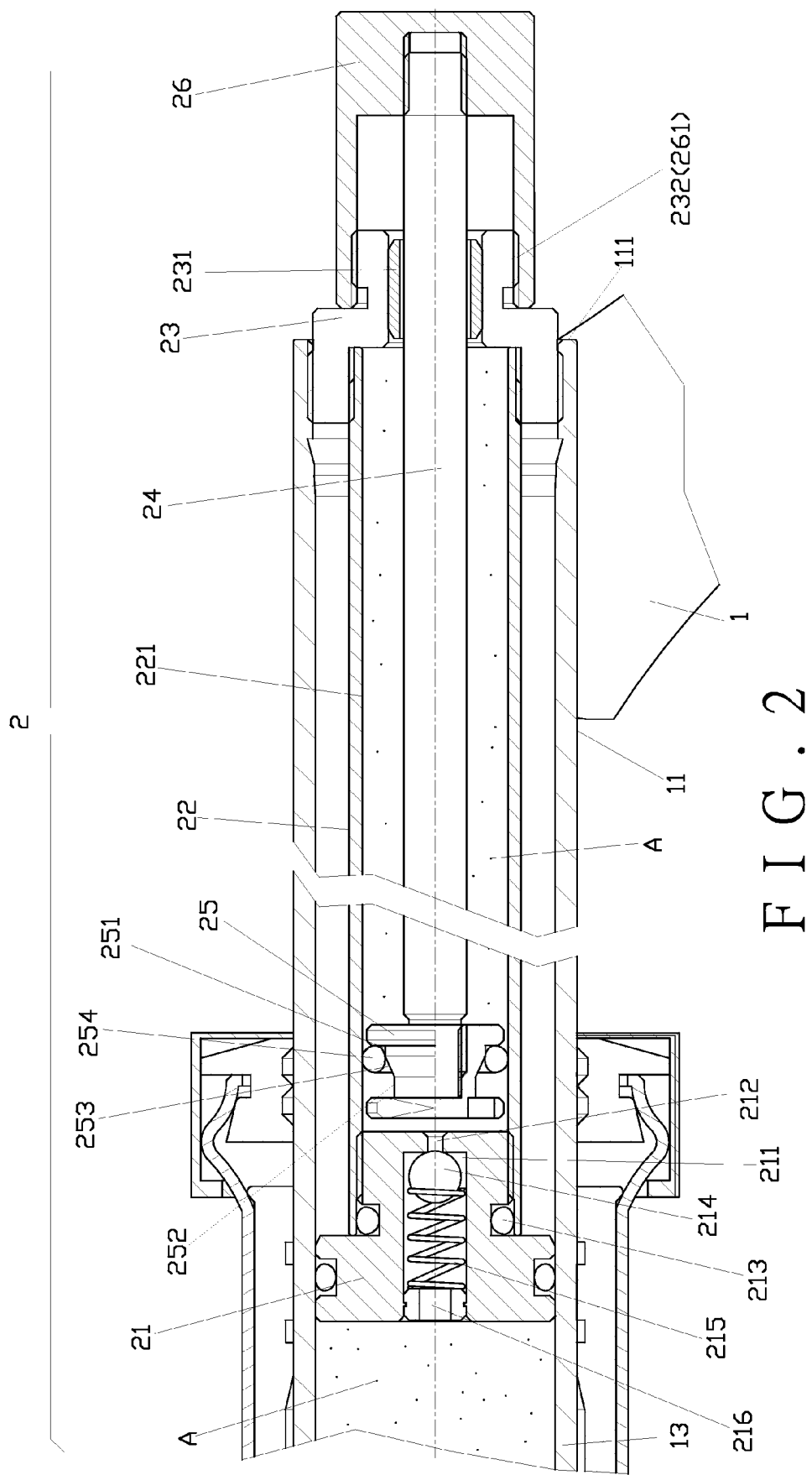
FIG. 2 is an enlarged view of the preferred embodiment of the present invention.

As shown in FIGS. 1 and 2, a front fork 1 of the present invention comprises a pair of front pipes 11 at respective sides thereof. One of the front pipes 11 is provided with an air pump 2 at a first end 111 of the front pipe 11, and an air release valve 12 is provided at a second end 112 of the pipe 11. An air chamber 13 to store air A is formed in the front pipe 11. The air pump 2 comprises a plug 21, a piston tube 22, a fixed plug 23, an axle 24, a piston 25, and a handle 26.

The plug 21 disposed in the front pipe 11 is formed with a recess 211 having a passage 212 at one end and a through hole 216 at an opposite end. An O-ring 213 is provided on the outer circumference of the plug 21. A bearing 214 and a spring 215 are placed in the recess 211 in sequence.

The piston tube 22 is inserted on the outer edge of the plug 21. The piston tube 22 has a hollow inner 221. One end of the piston tube 22 is fixedly connected with the fixed plug 23. The fixed plug 23 is secured to the first end 111 of the front pipe 11, and is formed with threaded 232 at the outer edge of the fixed plug 23. A washer 231 is provided in the fixed plug 23.

The axle 24 is inserted into the inner 221 of the piston tube 22. One end of the axle 24 is inserted through the washer 231 in the fixed plug 23 and exposed outward. The other end of the axle 24 is fixedly connected with the piston 25. A gap is formed between the inner wall of the piston tube 22 and the piston 25. The piston 25 comprises an enlarged section 251, a small section 252, and a slanting section 253 between the enlarged section 251 and the small section 252. A movable ring 254 is provided on the enlarged section 251.

The handle 26 is formed with a threaded hole 261 to engage with the threads 232 of the fixed plug 23.

Figure 3:
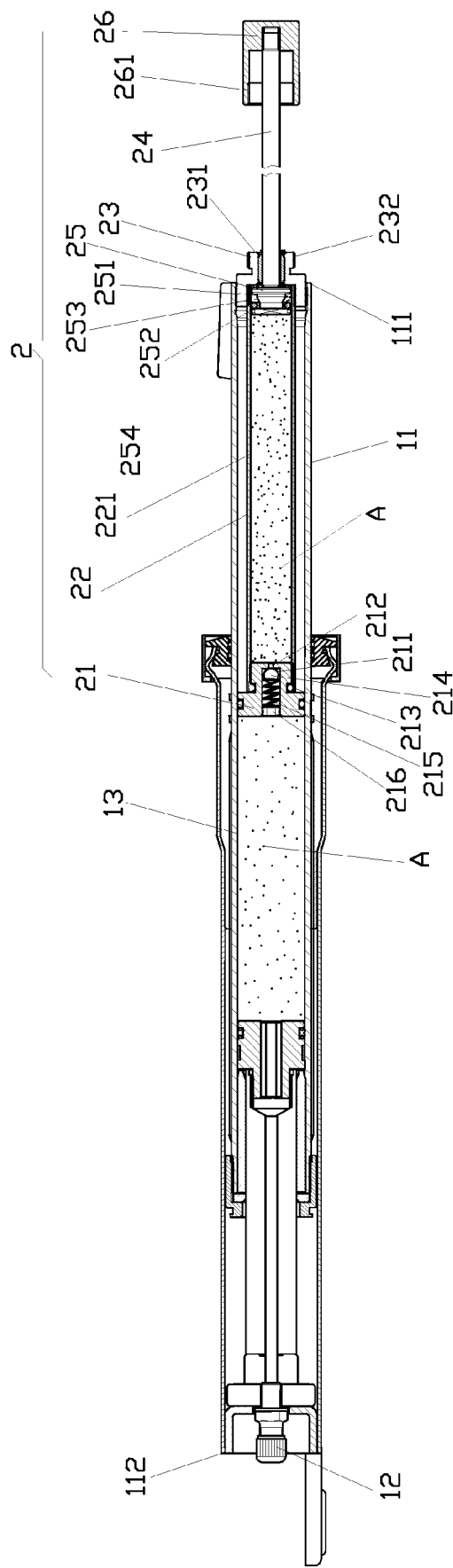
FIG. 3 is a cross-sectional view showing that an axle is pulled outwardly.
Figure 4:
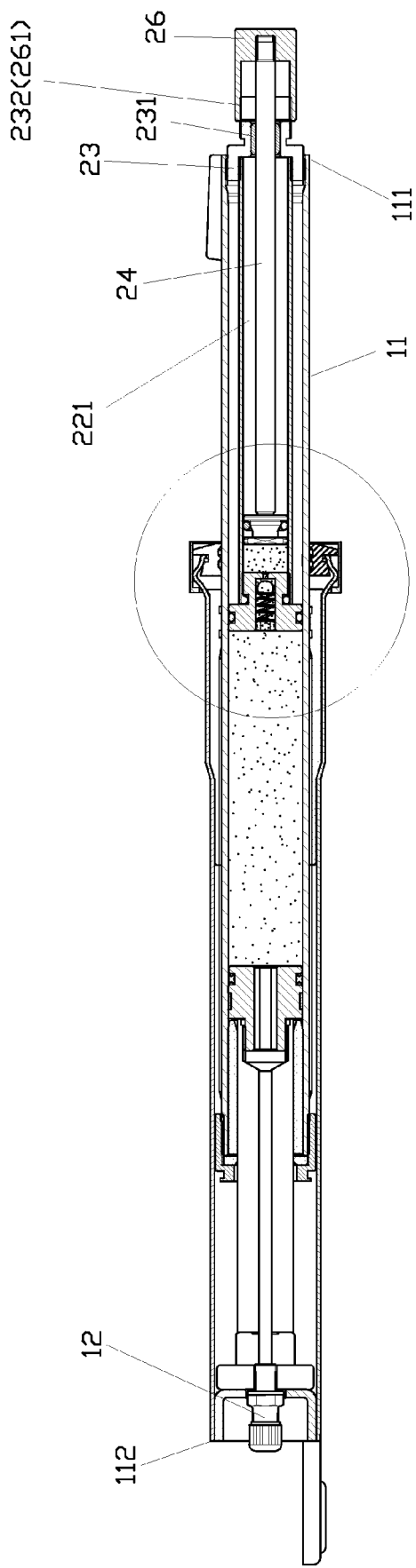
FIG. 4 is a cross-sectional view showing that the axle been is pushed inwardly.
Figure 4A:
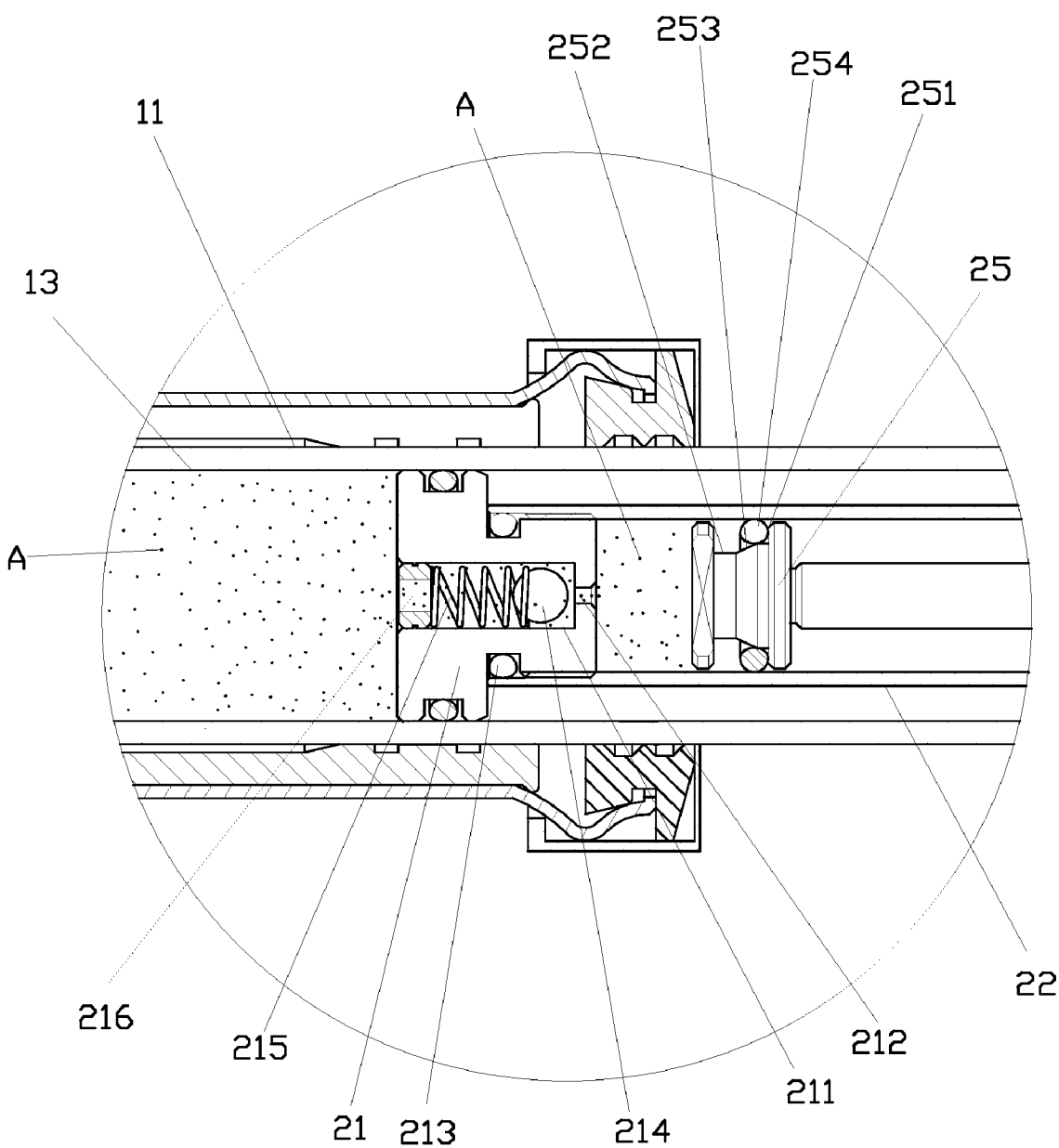
FIG. 4A is an enlarged view of FIG. 4.

To operate the present invention, as shown in FIGS. 3 and 4, after the bicycle is used for a period of time, the air A stored inside the front tube 11 of the front fork 1 will leak gradually, or when the air A stored in the front tube 11 is too much, the air A needs to be released through the air release valve 12, so that the front fork 1 can provide the user with a better riding experience. However, if the air A is released too much, the shock absorbing may not be as expected and the rider may experience uncomfortable riding. To solve this problem, the user may loosen the handle 26 from the fixed plug 23. By pulling the handle 26 outwardly, the axle 24 and the piston 25 are linked to move within the piston tube 22, which allows outer air entering into the inner 221 of the piston tube 22 through a gap formed between the washer 231 and the axle 24. The movable ring 254 on the enlarged section 251 at this moment will slide along the slanting section 253 down to the small section 252, which allows the air in the piston tube 22 to pass through the gap formed between the inner wall of the piston tube 22 and the edge of the piston 25. The air then fills in the space formed between the piston 25 and the plug 21. The handle 26 is then pushed inward, which forces the moving ring 254 move back towards the enlarged section 251 and to prevent the air A to be released from the gap between the inner wall of the piston tube 22 and the edge of the piston 25. The air pushed by the piston 25 urges the bearing 214 to compress the spring 215 in the plug 21, and the air A is then pumped into the chamber 13 of the front pipe 11 through the through hole 216. This increases the air pressure in the chamber 13 of the front pipe 11 to improve the effect of shock absorbing. When the chamber 13 has too much pressure from the air A, the air release valve 12 can release extra air in the chamber 13. This adjustment may help the rider to reach the best riding experience.

What is claimed is:

1. A front fork having an air pump, said air pump being disposed in one of a pair of front pipes at respective sides of said front fork, a plug being provided in the front pipe, a piston tube being inserted on an outer edge of said plug, said piston tube having a hollow inner, one end of said piston tube being fixedly connected with a fixed plug, a washer is provided in said fixed plug, said fixed plug being secured to one end of said front pipe, the air pump comprising an axle and a handle, said axle being inserted into the inner of said piston tube, one end of said axle being provided with a piston, a gap being formed between said piston and an inner wall of said piston tube, said piston comprising an enlarged section, a small section, and a slanting section between said enlarged section and said small section, a movable ring being provided on said enlarged section; said handle connected to said fixed plug being formed with a threaded hole.

2. The front fork having an air pump, as recited in claim 1, wherein said plug is formed with a recess having a passage at one end and a through hole at an opposite end, an O-ring being provided on said plug, a bearing and a spring being disposed in said recess.

3. The front fork having an air pump, as recited in claim 1, wherein one end of said fixed plug is formed with threads for connection with said threaded hole of said handle.

4. The front fork having an air pump, as recited in claim 1, wherein another end of said axle is inserted through said fixed plug and exposed outward.

5. The front fork having an air pump, as recited in claim 1, wherein said front pipe provided with said air pump comprises an air release valve at another end, and an air chamber is formed in said front pipe.

* * * * *